United States Patent [19]

Sahm et al.

[11] Patent Number: 5,401,053

[45] Date of Patent: Mar. 28, 1995

[54] MOTOR VEHICLE SUSPENSION SYSTEM

[75] Inventors: Dietrich Sahm, Bad Urach; Diether von Scarpatti, Esslingen, both of Germany; Dean C. Karnopp; David Beard, both of Davis, Calif.

[73] Assignee: Daimler-Benz AG, Germany

[21] Appl. No.: 124,478

[22] Filed: Sep. 22, 1993

[30] Foreign Application Priority Data

Sep. 22, 1992 [DE] Germany .......... 42 31 641.3

[51] Int. Cl.⁶ ............ B60G 17/00; B60G 17/08; B60G 17/027; B60G 21/10
[52] U.S. Cl. .................... 280/707; 188/299; 267/218; 267/33; 267/221; 267/186; 280/710; 280/714; 280/840
[58] Field of Search ............ 280/707, 714, 6.1, 840, 280/6.11, 668, 709, 710, DIG. 1, 6.12, 702, 703, 704, 840; 267/218, 221, 219, 220, 186, 183, 187, 33, 64.16, 64.17, 139–140; 188/299, 318

[56] References Cited

U.S. PATENT DOCUMENTS

| | | | |
|---|---|---|---|
| 3,218,088 | 11/1965 | Nallinger et al. | 280/840 |
| 3,414,278 | 12/1968 | Schmid | 267/218 X |
| 3,537,715 | 11/1970 | Gualdoni | 280/840 |
| 3,542,387 | 11/1970 | Schmid | 280/840 |
| 3,628,810 | 12/1971 | Graaf | 280/710 |
| 3,936,039 | 2/1976 | McKinnon . | |
| 4,154,461 | 5/1979 | Schnittger | 267/218 |
| 4,159,105 | 6/1979 | Laan et al. | 267/218 |
| 4,830,395 | 5/1989 | Foley . | |
| 4,919,440 | 4/1990 | Tsukamoto | 280/707 |
| 4,960,291 | 10/1990 | Lin | 280/710 |
| 4,973,079 | 11/1990 | Tsukamoto | 280/707 |
| 4,973,855 | 11/1990 | Kamimura et al. | 280/707 |
| 5,042,833 | 8/1991 | Kawabata | 280/707 |
| 5,096,168 | 3/1992 | Takehara et al. | 280/710 X |
| 5,098,120 | 3/1992 | Hayashi et al. | 267/217 X |
| 5,116,077 | 5/1992 | Karnopp et al. | 280/714 |
| 5,183,285 | 2/1993 | Bianchi | 280/710 X |

FOREIGN PATENT DOCUMENTS

| | | |
|---|---|---|
| 0426995 | 5/1991 | European Pat. Off. . |
| 1136219 | 9/1962 | Germany . |
| 1430186 | 9/1969 | Germany . |
| 2048323 | 4/1972 | Germany . |
| 1580316 | 11/1973 | Germany . |
| 2738455 | 3/1979 | Germany . |
| 3502579 | 7/1986 | Germany . |
| 3644931 | 2/1988 | Germany . |
| 3830168 | 3/1989 | Germany . |
| 3936987 | 5/1991 | Germany . |
| 5104926 | 4/1993 | Japan . |

*Primary Examiner*—Douglas C. Butler
*Attorney, Agent, or Firm*—Evenson, McKeown, Edwards & Lenahan

[57] ABSTRACT

A suspension system for motor vehicles has each wheel assigned a spring and a hydraulic unit and arranged in series with the latter. The ground clearance of the vehicle body can thus be altered wheel-by-wheel. A hydraulic feed system enables hydraulic fluid to be displaced between hydraulic units and allows pitching and rolling movements of the vehicle body to be counteracted.

6 Claims, 2 Drawing Sheets

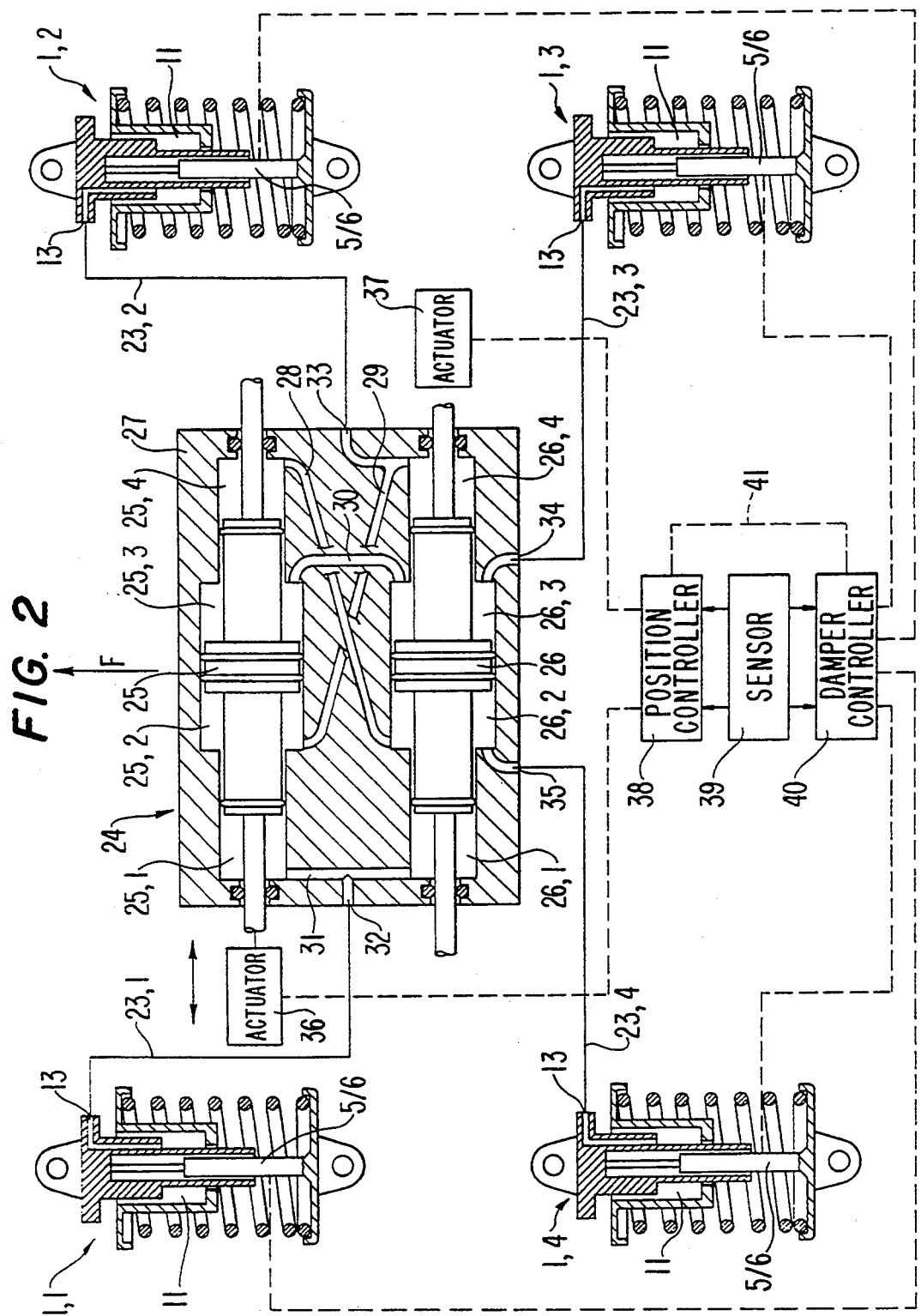

MOTOR VEHICLE SUSPENSION SYSTEM

BACKGROUND AND SUMMARY OF THE INVENTION

The present invention relates to a suspension system for motor vehicles, with hydraulic supporting units acting between the vehicle wheels and the vehicle body and with a hydraulic feed system arranged between the supporting units and operating under self-acting control, which system allows hydraulic fluid to be displaced between the supporting units in order to compensate, if required to overcompensate or to reduce pitching or rolling movements or tilted positions of the vehicle body.

In a system disclosed in German Patent No. 3,936,987, respective hydropneumatic supporting units are arranged between the vehicle wheels and the vehicle body, interacting with a relatively slow-acting level control system which, as a function of the lift position of the wheels, connects the supporting units via level control valves to a hydraulic pressure source in order to take up hydraulic fluid or to a reservoir to drain hydraulic fluid from the supporting units. An actively driven feed system is arranged in parallel with the level control system, between the supporting units, and allows hydraulic fluid to be displaced between supporting units of different wheels while bypassing the reservoir and the pressure source. In comparison with the level control system, this feed system is quick-acting and, in the event of a fault, in particular a fault in the associated computer, shuts down in a self-locking manner, blocking its lines. Any existing position compensation at the time of the occurrence of the fault is reduced by way of the level control system.

In this known system, hydraulic fluid is thus displaced directly between the supporting units on different sides of the vehicle or between the front and rear supporting units in order to raise one side of the vehicle while simultaneously lowering the other side of the vehicle or to move the front part of the vehicle in a corresponding manner in the opposite direction to the tail of the vehicle. It is thereby possible to counteract rolling and pitching movements. The power required for this purpose is low since all that is required is for the difference between the hydraulic pressures in the different supporting units to be overcome rather than the considerably greater pressure difference between the reservoir and the supporting units.

The level control system is slow-acting and accordingly likewise has a low power requirement. This system is not required to balance out pitching and rolling movements of the vehicle. Essentially, the level control system must merely be in a position to set the respectively desired or predetermined level within an acceptable time when the vehicle is started. In the event of a fault in the feed system, i.e. in particular, in the event of a fault in the associated electronic control, good emergency running characteristics of the vehicle are guaranteed.

All that is required is for the feed system to be disconnected from its energy supply by being cut off. The lines of the feed system or its feed device are thereby necessarily blocked. Even if this blocking occurs after the displacement of a relatively large quantity of hydraulic fluid between different supporting units, the vehicle remains fully under control since the level control system will, even if somewhat slowly, balance out the displacement of the hydraulic fluid again and, overall, ensure handling characteristics similar to those in vehicles with conventional hydropneumatic suspension systems without the feed system described above. This known suspension system is distinguished by good operating performance. However, due to the relatively high outlay on construction, it is only suitable for relatively expensive vehicles.

German Patent No. 3,644,931 discloses a similar suspension system with level control. German Offenlegungsschrift No. 3,502,579 and German Auslegeschrift No. 1,136,219 disclose mechanical suspension systems in which the spring elements are each arranged in series with hydraulic adjusting units which are used to adjust the level of the vehicle.

It is an object of the present invention to develop a system such that, on one hand, it is possible to use any desired suspension units even those with purely passive spring elements, for example helical springs or the like, in order to reduce the outlay on construction as far as possible. In addition, good emergency running characteristics should be achievable in the event of malfunctions, likewise with as low as possible constructional outlay.

The foregoing objects have been achieved according to the present invention by arranging the hydraulic supporting units in series with a spring unit acting between the wheel and the vehicle body and, in the event of a malfunction of the self-acting control, assuring that the units can be set to a central position or to a lowered end position by providing a hydrostatic feed system which, in the case of the malfunction, can be set to its (central) position, the position assigned to the central position, or the hydraulic units can be set to their lowered end position by being emptied.

Thus, according to the present invention, the hydraulic supporting units and the interposed hydraulic feed system form a system which is functionally separate from the spring units and which, in the event of a malfunction, can be shut down in a predetermined central position or end position, whereupon the handling characteristics are determined exclusively by the spring units and associated damper units.

According to a presently preferred embodiment of the invention, controllable shock dampers are provided, in each case in parallel with the spring units and in series with the supporting units. In this arrangement, the shock dampers cannot impair the action of the supporting units and of the feed system. In particular, this ensures that the feed system does not require any additional power to overcome the damping resistance of the shock dampers.

In a particularly expedient embodiment of the invention, it is possible to carry out control of the shock dampers independently of the self-acting control of the supporting units. The shock dampers can, for example, normally operate continuously with low damping and be switched to increased damping only if unwanted resonant vibrations, in particular in the event of so-called body resonance or of wheel resonance occur.

There is furthermore the advantageous possibility that the automatic control for the shock damper and the self-acting control for the supporting units interact, in such a way, for example, that pitching movements of the vehicle body are also counteracted by stiffening of the front or rear shock dampers of the vehicle and rolling movements are counteracted by stiffening of the shock dampers on one side of the vehicle. This offers the possibility of having the feed system operate comparatively slowly and counteracting abrupt pitching or rolling moments by way of the shock dampers.

The automatic control for the shock dampers can furthermore intervene in a compensating manner to a certain extent in the event of a malfunction of the self acting control for the hydraulic supporting units by virtue of the fact that the shock dampers are then also activated or activated to an increased extent in order to reduce pitching and rolling movements of the vehicle body.

In all these embodiments, it is advantageous that sensors for monitoring the positions or movements of the wheels or of the vehicle body can be used both for the work of the self-acting control for the supporting units and for the work of the automatic control for the shock dampers and that corresponding duplication is unnecessary.

BRIEF DESCRIPTION OF THE DRAWINGS

These and other features and advantages of the present invention will become more readily apparent from the following detailed description of a currently preferred embodiment thereof when taken in conjunction with the accompanying drawings wherein:

FIG. 2 is a schematic representation of the overall system of the present invention.

DETAILED DESCRIPTION OF THE DRAWINGS

Figure 1:
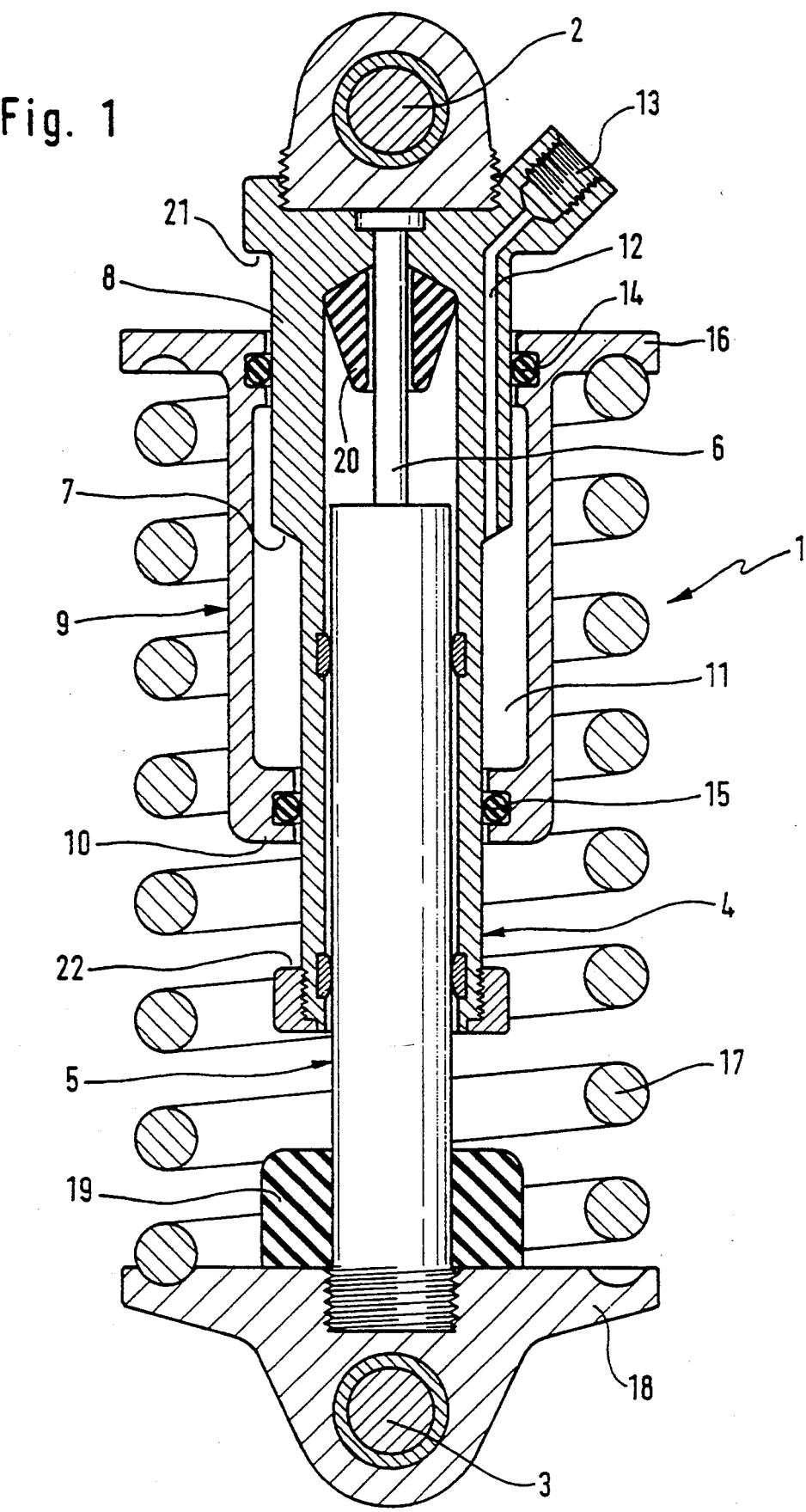
FIG. 1 is a partial cross sectional view of a spring strut of the type which can be provided for the suspension system according to the invention.

The spring strut 1 depicted in FIG. 1 is arranged in a cardanically pivotable manner on the vehicle body (not shown) by way of a body-side joint 2 of known type and on a conventional wheel-guiding element (likewise not shown), for example an axle, by way of a wheel-side joint 3.

A first cylinder 4 is arranged on the body-side joint 2 and accommodates in telescope-fashion a second cylinder 5 arranged on the wheel-side joint 3, i.e. the second cylinder 5 can be displaced axially within the first cylinder 4. The second cylinder 5 forms the cylinder component of a controllable shock damper which has a piston rod 6 held rigidly on the body-side joint 2. During axial stroke movements of cylinder 5 relative to cylinder 4, the piston rod 6 thus remains virtually at least, stationary relative to the cylinder 4.

Arranged on the outside of cylinder 4 is a piston-like thickened portion 8 which forms an annular step 7 and on which is guided, in axially displaceable fashion, a third cylinder 9. At the end at the bottom in FIG. 1, the cylinder 9 has a base 10 in the form of a circular disc with a central opening for the cylinder 4. Formed axially between the base 10 in the form of a circular disc and the annular step 7 is an annular space 11 which can be supplied with hydraulic fluid via an axial hole 12 in the thickened portion 8 and via a hydraulic connection 13 adjoining the said thickened portion. Sealing rings 14 and 15 for sealing off the annular gaps between the thickened portion 8 and cylinder 9 and between cylinder 4 and the central hole in the base 10 shut off the annular space 11 from the outside in a hydraulically sealed manner.

A flange 16 is arranged on the outside of cylinder 9 and forms a body-side abutment for a helical compression spring 17. The wheel-side abutment for the spring 17 is formed by a plate 18 situated axially opposite the flange 16 on the wheel-side joint 3. A resilient buffer 19 surrounding the cylinder 5 and made of elastomeric material can be arranged radially within the helical compression spring 17. This buffer 19 interacts with the facing end of the cylinder 4 when the cylinder 5 is pushed sufficiently far into the cylinder 4.

Additionally or alternatively, a resilient buffer 20 surrounding the piston rod 6 can be arranged on the body-side joint 2 or the base, at that location, of cylinder 4 and interact with the facing end of cylinder 5 as soon as the latter is pushed sufficiently far into cylinder 4.

By feeding hydraulic fluid into the annular space 11 or by discharging hydraulic fluid from this annular space 11, the cylinder 9 and the body-side abutment formed by the flange 16 for the helical compression spring 17 can be displaced-relative to the body-side joint 2 and the ground clearance of the vehicle body at the respective spring strut 1 changes accordingly. The displacement travel of cylinder 9 in the upward or downward direction relative to cylinder 4 is limited by stops 21 and 22 in the form of annular steps.

The maximum displacement of the cylinder 5 relative to the cylinder 4 is limited by the maximum displacement travel of the piston (not shown) fixed on the piston rod 6 of the shock damper, the cylinder compartment of which is formed by the cylinder 5.

Assume in FIG. 2 that a vehicle (not shown specifically) travelling in the direction F of forward travel has a total of four spring struts 1,1 to 1,4 of the type depicted in FIG. 1 to support the vehicle structure on the wheels. Spring struts 1,1 and 1,2 are assigned to the front wheels, and spring struts 1,3 and 1,4 are assigned to the rear wheels. The hydraulic connections 13 of these spring struts 1,1 to 1,4 are connected via lines 23,1 to 23,4 to a hydrostatic feed unit 24 which, in the manner explained below, makes it possible, on the one hand, to displace hydraulic fluid between the annular spaces 11 of the front spring struts 1,1 and 1,2 and between those of the rear spring struts 1,3 and 1,4 and, on the other hand, to displace it between the spring struts 1,2 and 1,4 on the right-hand side of the vehicle and between the spring struts 1,1 and 1,3 on the left-hand side of the vehicle 1. As a result, the vehicle body tries to perform a pitching movement relative to the vehicle transverse axis or a rolling movement relative to the vehicle longitudinal axis, respectively.

The feed unit 24 has two double-acting stepped pistons 25, 26 of symmetrical configuration which are arranged displaceably in correspondingly stepped bores of a housing 27 and, in the housing 27, separate piston working spaces 25, 1 to 25,4 and 26,1 to 26,4 from one another. The cross-sections of the parts of the stepped pistons 25, 26 and of their piston rods are dimensioned such that the stepped pistons 25, 26 operate with the same effective cross-sections in all the piston working spaces 25, 1 to 26,4. Thus, for example, if stepped piston 25 is displaced to the right in FIG. 2, the volumes of piston working spaces 25, 1 and 25,2 increase by the same amount, which is identical to the amount of reduction in size of piston working spaces 25,3 and 25,4. The same applies to piston working spaces 26, 1 to 26,4 if stepped piston 26 is displaced.

The piston working spaces 25, 1 to 26,4 are connected to one another via lines 28 to 31 and via connection 32 to 35 to lines 23, 1 to 23,4 so that, when stepped piston 25 is displaced, hydraulic fluid is displaced between the annular spaces 11 of spring struts 1,1 and 1,3, on one hand, and those of spring struts 1,2 and 1,4, on the other hand. When stepped piston 26 is displaced, however, hydraulic fluid is displaced between the annular spaces 11 of spring struts 1,1 and 1,2 on one hand, and those of spring struts 1,3 and 1,4, on the other hand. As a result, by displacement of stepped piston 25, of counteracting a pitching movement of the vehicle body dan be counteracted during braking or during starting, while a displacement of stepped piston 26 allows rolling movements of the vehicle body to be counteracted.

The stepped pistons 25, 26 or, more precisely, their piston rods, are actuated by respective actuating units 36, 37 which, for their part, are controlled by a position controller 38. The input of the position controller 38 is connected to body and/or wheel sensors 39, from the signals of which the position controller 38 can determine how the vehicle body is moving or is attempting to move. The sensors 39 can, for example, be stroke transmitters whose signal represents the retraction travel of piston rod 6 in cylinder 5. Body movements and wheel movements can then be determined from the change in these signals.

It is also further possible for acceleration sensors to be arranged on wheel guiding elements or on the wheel-side joints 3 of the spring struts and/or on the vehicle body and for motion tendencies of the vehicle body or of the wheels to be determined directly from their signals. In this manner, the position controller 38 can, by appropriate control of the actuating units 36, 37, displace the stepped pistons 25, 26 such that rolling and pitching movements of the vehicle body are avoided to the greatest possible extent.

The signals from the above mentioned sensors 39 are furthermore fed to a damper controller 40, which actuates actuating elements (not shown) at the controllable shock dampers 5/6, raising or lowering their damping resistance relative to a normal level.

An increased damping resistance is, in general, only set if oscillations in the range of the resonance of the body (on the order of 1 Hz) or in the range of the resonance of the wheels (on the order of 10 Hz) occur between the wheels and the vehicle body. As long as the frequencies of oscillations which occur are sufficiently far from these resonances, as a rule only very low damping resistance is set. The position controller 38 and the damping controller 40 can be linked via signal lines 41 in order to assist each other's effectiveness.

If, for example, the vehicle attempts to perform a diving movement during a braking operation, this movement can, on the one hand, be counteracted by displacement of stepped piston 25 to the left in FIG. 2; in addition, the shock dampers 5/6 of spring struts 1,1 and 1,2 can be stiffened. As a result, the inward defection stroke of the springs 17 of spring struts 1,1 and 1,2 is slowed down allowing the displacement of the cylinders 9 on the cylinders 4 of spring struts 1,1 and 1,2 to counteract the braking movement more effectively.

Position controller 38 checks itself continuously to ensure that it is operating in a fault-free manner. If the position controller 38 ceases to operate in a fault free manner, provision can be made for the actuating units 36 and 37 to set the pistons 25 and 26 to the central position illustrated in FIG. 2 and to hold them in that central position. The displaceable cylinders 9 thus continuously occupy the central position illustrated in FIG. 1.

It is also possible, instead, to use valves (not shown) arranged, for example, at the connections for lines 23, 1 to 23, 4 to the housing 27 of the feed unit 24 to empty the annular spaces 11 of the spring struts 1 or, more precisely, 1,1 to 1,4 until the cylinders 9 come to rest with their flanges 16 against the stop 21 (cf. FIG. 1) of the spring struts, with the ground clearance of the vehicle being reduced in a corresponding manner. During this process, the characteristic of the suspension simultaneously becomes harder because, in parallel with the helical spring 17, the resilient buffers 19 and 20 also come into effect relatively frequently during inward deflection strokes.

Whenever the position controller 38 is not operating correctly and one of the above mentioned modes of operation (i.e., pistons 25 and 26 in the central position or cylinders 9 against the stop 21) has accordingly been set, the damping controller 40 can activate the shock dampers 5/6 to an increased extent such that pitching or rolling movements of the vehicle body are counteracted by stiffening of the shock dampers 5/6. To make this possible, the damping controller 40 is supplied via the signal line 41 with appropriate signals on the mode of operation of the position controller 38.

The damping controller 40 also monitors itself continuously to ensure that it is operating in a fault free manner. If this is not guaranteed, the shock dampers 5/6 are no longer controlled, i.e. the shock dampers 5/6 operate like conventional, non-controllable shock dampers, and provision is expediently made for the damping characteristic of the shock dampers 5/6 for non-controlled operation to be configured to match that for a vehicle with non-controlled shock dampers. This guarantees safety in all speed ranges, even if this is at the expense of a loss of comfort to a greater or lesser degree.

As a modification of the embodiment depicted in FIG. 2, provision can be made for the operative cross sections of some parts of the pistons 25, 26 to be of unequal size. Thus, although the operative cross-sections of piston 26 in working spaces 26, 1 and 26,4, on one hand, and in working spaces 26,2 and 26,3, on the other hand, are in each case of equal size, the operative cross-sections in working spaces 26, 1 and 26,4, and in spaces 26,2 and 26,3, can be different. For example, the operative cross-section of 26, 1 and 26,4 can be larger than that of spaces 26,2 and 26,3. As a result, rolling moments are predominantly supported by one axle e.g. by the front axle in the illustrated embodiment. With regard to piston 25, only the operative cross-sections in spaces 25, 1 and 25,2, on one hand, and those in the spaces 26,3 and 26,4, on the other hand need be of equal size, while the operative cross-sections in spaces 25, 1 and 25,4 and 25,2 and 25,3, respectively, can be different.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A suspension system for a motor vehicle, comprising hydraulic supporting units acting between wheels of the motor vehicle and a body of the motor vehicle, and a hydraulic feed system operatively arranged between the supporting units and a self-acting control apparatus to allow hydraulic fluid to be displaced between the supporting units in order to control movements or positions of the motor vehicle body, wherein the hydraulic supporting units each have a body side first cylinder and a second cylinder operatively arranged to be telescopically displaced in the first cylinder to form controllable shock dampers, and a third cylinder arranged hydraulically displaceably on the first cylinder, are each arranged in series with a spring unit acting between one of the motor vehicle wheels and the motor vehicle body with a body-side abutment on the third cylinder and an abutment on the first cylinder for holding therebetween an associated one of the spring units and, in the event of a malfunction of the self-acting control apparatus, are settable to one central position between upper and lower end positions of the hydraulic supporting units; and the hydraulic feed system comprises a hydrostatic feed system which, in the event of the malfunction of the self-acting control apparatus, is settable to a position which is associated with one of the central position and the lower end position of the hydraulic units by emptying hydraulic fluid from the hydraulic units.

2. The suspension system according to claim 1, wherein the hydraulic supporting units comprise the controllable shock dampers provided in parallel with each of the spring units.

3. The suspension system according to claim 2, wherein a second control is provided for the shock dampers independently of the self-acting control apparatus of the hydraulic supporting units.

4. The suspension system according to claim 3, wherein, in the event of the malfunction of the self-acting control apparatus for the hydraulic supporting units, the shock-damper control is configured to activate the shock dampers such that pitching and rolling movements of the motor vehicle body is reduced.

5. The suspension system according to claim 2, wherein the self-acting control apparatus for the hydraulic supporting units and the second control for the shock dampers are operationally related to assist each other.

6. The suspension system according to claim 1, wherein resilient buffers are operatively arranged with respect to the hydraulic supporting units to come into effect in parallel with the spring units when the vehicle body is lowered.

* * * * *